(12) United States Patent
Ohba

(10) Patent No.: US 6,963,724 B2
(45) Date of Patent: Nov. 8, 2005

(54) DATA PROVIDING SYSTEM, METHOD AND COMPUTER PROGRAM

(75) Inventor: Akio Ohba, Kanagawa (JP)

(73) Assignee: Sony Computer Entertainment Inc., (JP)

( * ) Notice: Subject to any disclaimer, the term of this patent is extended or adjusted under 35 U.S.C. 154(b) by 750 days.

(21) Appl. No.: 09/916,936

(22) Filed: Jul. 27, 2001

(65) Prior Publication Data

US 2002/0065090 A1 May 30, 2002

(30) Foreign Application Priority Data

Jul. 28, 2000 (JP) .............................. 2000-229131
Jul. 6, 2001 (JP) .............................. 2001-207024

(51) Int. Cl.[7] .............................................. H04H 1/00
(52) U.S. Cl. ..................... 455/3.03; 455/450; 455/453; 455/509
(58) Field of Search .............................. 455/3.01, 3.02, 455/3.03, 3.05, 3.06, 414.1, 414.3, 418, 419, 455/453, 507, 560, 3.04, 445, 412.1, 412.2, 455/450, 452.1, 509, 514, 519, 11.1, 13.1; 709/219, 217, 218

(56) References Cited

U.S. PATENT DOCUMENTS 6,166,735 A * 12/2000 Dom et al. .................. 345/749
6,226,618 B1 * 5/2001 Downs et al. .................. 705/1
6,317,784 B1 * 11/2001 Mackintosh et al. ........ 709/219

FOREIGN PATENT DOCUMENTS

| GB | 2 347 332 A | 8/2000 | |
| GB | 2347332 A | * 8/2000 | ............. A63F 9/00 |
| JP | 10-286380 A | 10/1998 | |
| WO | WO 99/18518 A2 | 4/1999 | |
| WO | WO 00/19646 A1 | 4/2000 | |

OTHER PUBLICATIONS

Andreas Varga, "PARSEC: Building the networking architecture for a distributed virtual universe," Institute of Computer Graphics, University of Technology, 1999, Vienna, Austria.

* cited by examiner

Primary Examiner—Nay Maung
Assistant Examiner—John J. Lee
(74) Attorney, Agent, or Firm—Lerner, David, Littenberg, Krumholz & Mentlik, LLP

(57) ABSTRACT

A data providing system utilizes the resources of a digital broadcast and a network efficiently so as to provide data for a great number of users at high efficiency. The system includes a server station for communicating with terminal devices individually via the network, and a host station for transmitting the same data to all the terminal devices all at once in real time by the digital broadcast. Individual data and light-load data are handled by the server station, and the information such as load data, which should be shared by the terminal devices, are handled by the host station.

12 Claims, 8 Drawing Sheets

DATA PROVIDING SYSTEM, METHOD AND COMPUTER PROGRAM

CROSS-REFERENCE TO RELATED APPLICATIONS

This application is based upon and claims the benefit of priority from the prior Japanese Patent Application No. 2000-229131, filed Jul. 28, 2000, and 2001-207024, filed Jul. 6, 2001, the entire contents of both of which are incorporated herein by reference.

BACKGROUND OF THE INVENTION

The present invention relates to a data providing technique for providing useful information for users in real time, achieved by combining a personal communication mode which utilizes a network such as the Internet and a global data distribution mode such as a digital broadcast.

Digital broadcasts using cables, artificial satellites and ground waves are now very popular. The digital broadcasts include not only a mode for distributing program data to an indefinite number of persons in the general public as its objects (to be referred to as "normal distribution" hereinafter), but also a mode for delivering contents of movies, games and the like for particular persons at cost (to be referred to as "contents delivery").

In the case of the normal distribution, a distributor prepares a broadcast station (to be called "host station" hereinafter) for distributing program data. A user side is equipped with an antenna, a digital receiving unit, a display unit and an audio unit, and program data transmitted from the host station is received through the antenna, and the received data is reproduced by the digital receiving unit in the form of a corresponding image and sound. More, specifically, the image is displayed on the display unit and the sound is outputted from the audio unit.

In the case of the contents delivery, a distributor prepares a server station for managing users of subjects to whom data should be delivered, in addition to the host station. A user side prepares an STB (set top box) which can be connected to a network such as the Internet, in addition to an antenna, a digital receiving unit, a display unit and an audio unit. In this specification, these units equipped on the user side are called "terminal device". The server station and a terminal device are set up to receive or transmit data through the network.

When a user makes a request for contents to the server station via the terminal device and the network, the server station carries out identification of the user who made the request, and then transmits key data to be used for the restoration of the contents, which are encoded or scrambled, to the terminal device of the user. At the same time, the server station instructs the host station which performs the digital distribution, to transmit the ordered contents (encoded or scrambled) to the user.

The host station transmits the ordered contents upon the instruction of the server station.

The terminal device receives the distributed contents and restores the contents using the key data transmitted from the sever station. Of the restored contents, the image is displayed on the display unit and the sound is outputted from the audio unit.

In the above-described procedure, the user can enjoy the contents at cost.

SUMMARY OF THE INVENTION

In the conventional contents distribution, the digital broadcast from the host station is used only for the distribution of the contents which are encoded or scrambled, and the network connecting the server station and the terminal device is used only for the transmission and reception of the order of contents and the key data. Thus, the resource for the digital broadcast and that for the network are completely separated from each other in terms of their functions and there is no organic usage done such as that these resources are associated with each other if necessary in real time. As a result, conventionally, these resources are not fully utilized.

The main object of the present invention is to provide a data providing technique capable of providing multi-objective data at a high efficiency to the users, by making a full use of the resources for distributing the digital data.

In order to achieve the above-described object, there is provided, according to the present invention, a data providing system including: a first device for communicating individually with a plurality of terminal devices; and a second device for transmitting data to all of terminal devices that are in communicable state with the first device at once.

One of the first and second devices transmits part of reproducible data to be provided to those of the terminal devices which are in a communicable state with it. The rest of the data to be provided is transmitted to those in communicable state from the other of the first device and the second device. In this manner, the provided data is reproduced in those terminal devices in real time.

The terminal devices and the first device are connected with each other via a network. The first device can be structured to transmit individual data prepared in accordance with a request from any one of terminal devices to that one. In this case, the second device is structured to transmit common data indicating the operation status of the network, which changes occasionally in accordance with the load on the first device, to all of the terminal devices at once. With the above-described structure, the user can find the operation status of the network from the second device before trying to access the first device through the terminal device of the user, and thus it is possible to prevent a decrease in the load on the network caused by unnecessary accessing to the first device.

In the case where there are a plurality of first devices, the second device transmits operation status data indicating the operation state of the network, which changes occasionally in accordance with the load on the respective one of the first devices, to all of the terminal devices at once, and transmits as a proxy data to be sent by the first device when some or all of said plurality of first devices have a load which exceeds a predetermined value. With this structure, the user can find desired data through the second device even when the load on the network is so heavy that it is not possible to access the first device. Therefore, the data providing system can provide the user with desired data while preventing an increase in the load on the network.

At least one of said plurality of first devices further includes: a data generating unit for generating load data indicating a load status of said at least one of devices which changes occasionally in accordance with an access status sent from said plurality of terminal devices; and a unit for transmitting thus generated load data to the second device in real time. The second device generates the operation status data on the basis of the load data received from one of the first devices.

Further, there is provided, according to the present invention, a data providing system for providing data via a logical space which can be referred to by a terminal device.

This data providing system includes: a first device for communicating individually with a plurality of terminal devices each connected to a network; and a second device for transmitting data of the same contents to these terminal devices all at once.

These terminal devices and the first device are of types which can form a common logical space. The first device detects a request of revision of the logical space from at least one terminal device, and changes the logical space on the basis of the detected status. The second device sends the status of the logical space after revision in the first device all at once to said plurality of terminal devices in real time.

In the case where a plurality of first devices are used, these first devices are formed to have logical spaces accessible by a plurality of terminal devices, these logical spaces are formed dispersed from each other but associated with each other. The second device, when the status of the logical space changes in any one of the first devices, provides the statuses of all the logical spaces after the change to said plurality of terminal devices in real time. With this structure, it is possible to provide data at high degree while lightening the load on each and individual first device (the load resulting in operating the logical space). Further, the status of some other first device which is not accessed can be known through the second device, and therefore the user can find the data of the entire logical space while obtaining data from the logical space.

At least one of said plurality of first devices further includes: a status changing unit for forming a logical space having the same structure as the logical space formed in the first device to be accessed by the self terminal device, within the self, and for changing the status of the formed logical space, and a data transmitter for transmitting, when the status of the logical space within the self terminal device has changed, data indicating the changed status to the first device to be accessed by the self device in real time.

The second device described above may be constructed by an exclusive-use data providing device capable of communicating individually with these first devices, and transmitting data all at once to these terminal devices. This device may be constituted by a computer having a communication function and a computer program executed as it is read by the computer, in such a manner that they function in cooperation with each other.

The present invention further provides a plurality of examples of the data providing method which is operated via a network.

The method according to the first example is of a type characterized by including the steps of: distributing part of data to be provided to a plurality of terminal devices connected a network, to a first device communicable individually to each of said plurality of terminal devices; distributing a rest of data to be provided, to a second device which transmits data towards said plurality of terminal devices all at once; and transmitting the data distributed to the first device and the second device at the same time, thereby enabling each of said plurality of terminal devices to reproduce the data to be provided in real time. With this method, it is possible to organically utilize the broadcasting and the network.

The second example of the method is of a type including the steps of: distributing individual data to be provided to those of a plurality of terminal devices connected a network, that has made a request, to a first device communicable individually to said plurality of terminal devices; distributing data indicating a load status of the first device or the network, to a second device which transmits data towards said plurality of terminal devices all at once; and transmitting the data distributed to the second device prior to transmission of the data distributed to the first device, thereby enabling to present the load status of the first device when the terminal device actually has accessed the first device, or the load status of the network to a terminal device which is accessing to the first device. With this method, the loading status can be known in advance, and therefore unnecessary accessing will not be made from a terminal device.

The third embodiment of the method is of a type including the steps of: forming a logical space common to a plurality of terminal devices connected a network, and a first device communicable individually to each of said plurality of terminal devices; and transmitting, when a status of the logical space has changed in accordance with an accessing status from any of said plurality of terminal devices, a status of the changed logical space, to all of said plurality of terminal devices at once in real time. Thus, an object is made to appear, move and delete in logical spaces, and in this manner, common data can be visually provided.

BRIEF DESCRIPTION OF THE DRAWINGS

These objects and other objects and advantages of the present invention will become more apparent upon reading of the following detailed description and the accompanying drawings in which.

DETAILED DESCRIPTION

Embodiments of the data providing system to which the present invention is applied will now be described in detail.

Figure 1:
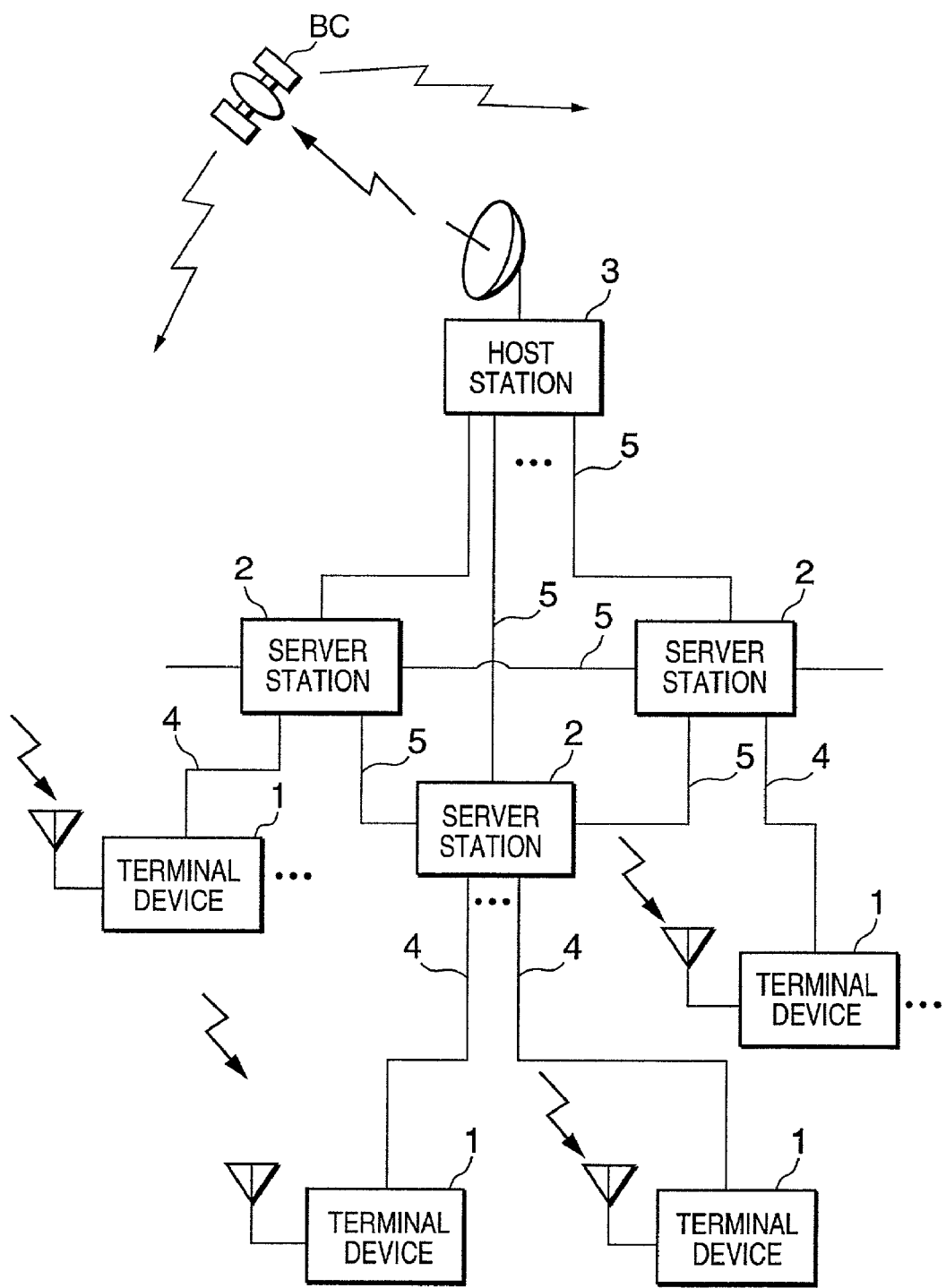
FIG. 1 is a structural diagram showing a data providing system according to the present invention.

The data providing system of this embodiment is capable of providing data to a great number of users as objects, and has such a structure as shown in FIG. 1, in which a plurality of server stations 2, each of which is an example of the first device, and a host station 3, which is an example of the second device, are connected together via a network, and also each server station 2 and a terminal device 1 operated by the user are connected via a network 4. The host station carries out digital broadcasting via a satellite BC.

As the networks 4 and 5, the Internet can be used. When only the Internet is used, there may be a time when it is difficult to connect a terminal device to the server station 2, as in the case where a number of terminal devices 1 start the setting-up of the communications at the same time. For this reason, if it is necessary to assure the communication between the server station 2 and the host station 3, it is preferable that independent networks are employed for the networks 4 and 5, respectively, rather than using only the Internet.

The structures of the server station 2, the host station 3 and each of the terminal devices 1 will now be described.

<Server Station>

The server station 2 transmits and receives individual data between itself and the terminal device 1, and also requests the host station 3 to transmit data common to all the terminal devices 1, to that particular device. If necessary, the server station 2 passes data between itself and the terminal device via a virtual reality space which is an example of the logical space.

The server station which is operated as described above can be realized by a computer including a CPU (central processing unit), a communication mechanism, a RAM (random access memory), a ROM (read only memory) and a memory device. The CPU reads and executes a predetermined program and data, and thus forms a function block and data file, which are used to realize the processing operation executed by the server station 2, as will be described later. Programs and the like are stored in the memory device which can be read by the CPU, or distributed via the network. The communication mechanism is of a conventionally known type for transmitting and receiving data between the server station and the terminal device 1 as well as the host station 3 via the networks 4 and 5. More specifically, this mechanism includes a section for receiving and transmitting data from and to the terminal device 1, and another section for receiving and transmitting data from and to the host station 3, and these sections independently carry out the transmission and reception of data. The RAM temporarily stores data generated as a result of each processing operation, as well as data transmitted from the terminal device or the host station 3 via the communication mechanism. The ROM stores basic programs and data necessary for the operation of the server station 2. The memory device is a so-called hard disk in which a magnetic recording medium is equipped, and it stores, for example, large-size data such as the operating system and application programs.

Figure 2:
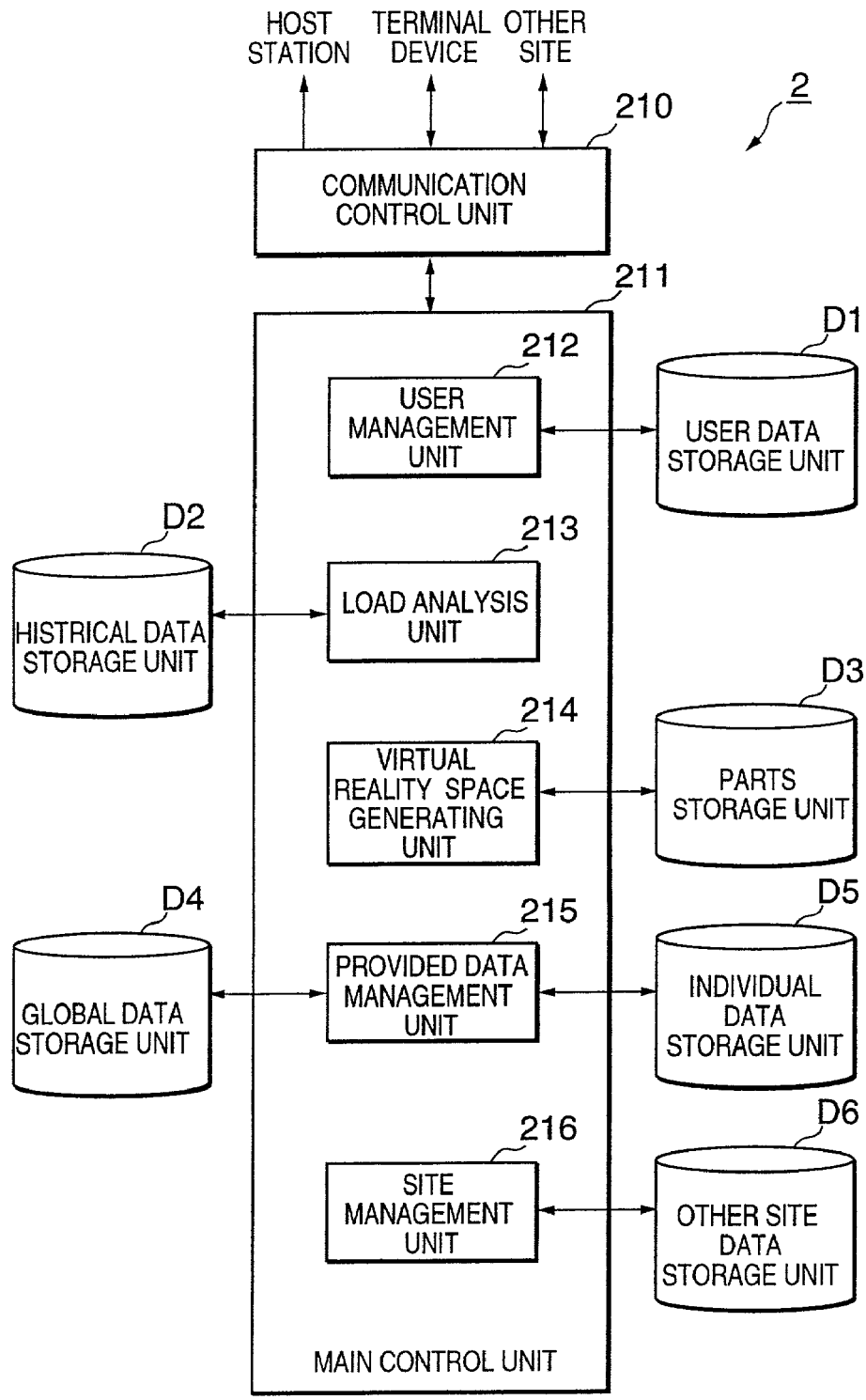
FIG. 2 is a structural diagram showing functions of a server station.

An example of the structuralized functions formed by the CPU is shown in FIG. 2. As can be seen in FIG. 2, the server station 2 has a communication control section 210 and a main control section 211, and further various types of data files including a user data storage unit D1, a historical data storage unit D2, a parts storage unit D3, a global data storage unit D4, an individual data storage unit D4, and an other site data storage unit D6 (here the term "site" refers to a server station or other Web server, and the term will be used with that meaning hereinafter).

The main control unit 211 further includes a user management unit 212, a load analysis unit 213, a virtual reality space generating unit 214, a provided data managing unit 215 and a site management unit 216 each as a module in execute mode which is initiated when a respective processing and the like is requested.

The communication control unit 210 is used to transmit and receive data among itself, the host station 3, the terminal device 1 and other sites. When the communication control unit 210 transmits and receives individual data between itself and a terminal device 1, it receives instruction data from the terminal device 1 serving as a communication opponent, and sends back data in response to the instruction data to the terminal device 1 which made the instruction.

The user management unit 212 carries out authentication of the user at the time of accessing on the basis of, for example, the user identification data and the password stored in the user data storage unit D1, and then, if necessary, executes operations such as those carried out by a server station in the conventional digital broadcasting, for example, sending a key of cryptograph to the terminal device 1. The load analysis unit 213 analyzes the present load status of the self station on the basis of the number of accesses made by the terminal device 1 to that station, the results of the past analysis stored in the historical data storage unit D2, and the processing contents of the same type to the terminal device 1.

The virtual reality space generating unit 214 generates a virtual reality space which can be shared with each terminal device 1, from the structural elements of the virtual reality space stored in the parts storage unit D3, such as a background image and an object image expressed by parts data, material data and the like. The virtual reality space is generated to a predetermined region of an external memory device or an auxiliary memory device, which can be read by the CPU. The virtual reality space is a global space virtually established, in which, for example, network games are played using ordinary Internet homepages and the Internet. The virtual reality space can provide common data to the users via the terminal devices 1.

The provided data management unit 215 specifies the individual data to be provided to a terminal device 1 upon request of the terminal device 1 itself, and global data provided via the host station 3. The global data contains, for example, load data indicating the status of the self station as to how busy it is, or the status (how busy it is) of connection of the network 4 to the self station, or data indicating the changing status of the virtual reality space when the instruction from the terminal device 1 is reflected on the virtual reality space. The global data is usually stored in the global data storage unit D4. The individual data is data addressed to the individual user, and is stored in the individual data storage unit D5. It should be noted here that, as an alternative structure, the individual data may be acquired from an external system at each time of the distribution.

The site management unit 216 manages data passed between itself and some other sites related to the data distribution. More specifically, the identification data of the involved site and the data received from the site are stored in the other site data storage unit D6, and these data are provided appropriately in response to a request from the terminal device 1.

<Host Station>

The host station 3 distributes contents and various types of data received from the server station 2 and the like, to each of the terminal devices 1 via the digital broadcast. In this embodiment, the digital broadcast is done by the satellite BC; however as long as it is possible to transmit data all at once to terminal devices of an indefinite number of persons in the general public, other modes can be employed such as ground waves and cables. Data to be distributed are provided from the server stations 2 in real time.

The host station 3 has a structure of a type of a computer which includes the CPU, communication mechanism, RAM, ROM and digital broadcast mechanism. The CPU reads and executes the programs and data stored in the ROM, and thus sets up functions for operating the computer as the host station 3. The communication mechanism is used to transmit and receive data between a plurality of server stations and other sites via the network 5. The RAM temporarily stores data generated as a result of each processing operation. The ROM stores basic programs and data necessary for the operation of the host station 3. The digital broadcast mechanism distributes not only ordinary contents but also data to be distributed to each terminal device 1 as common data via the satellite BC.

Figure 3:
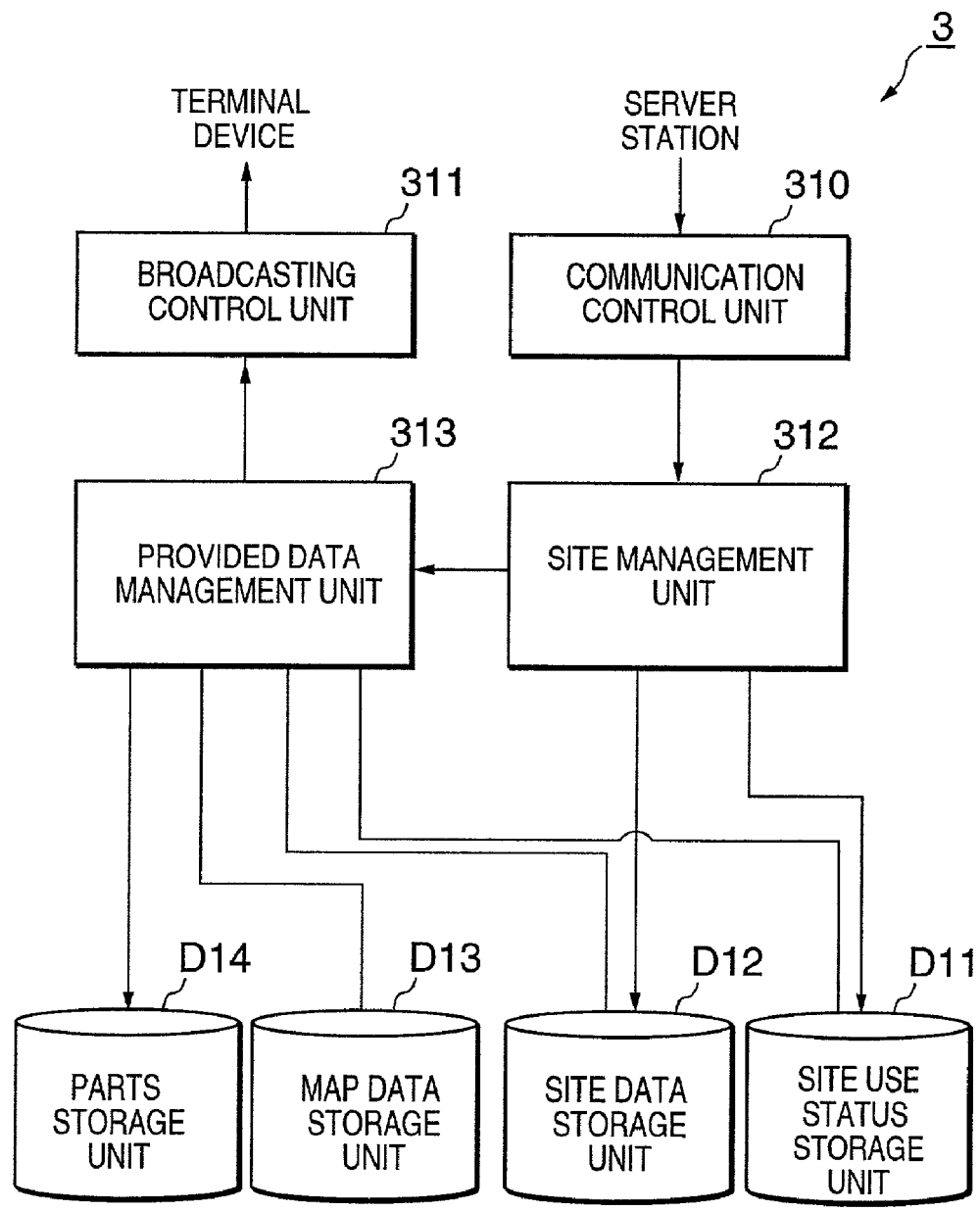
FIG. 3 is a structural diagram showing functions of a host station.

An example of the structuralized functions formed by the host station 3 is shown in FIG. 3. As can be seen in FIG. 3, the host station 3 has modules in execute form, which are read out when the device is started, such as a communication control section 310, a broadcast control unit 311, a site management unit 312 and a provided data management unit 313, and also data files such as a site use status storage unit D11, a site data storage unit D12, a map data storage unit D13 and a parts storage unit D14.

The communication control unit 310 transmits data received from each server station 2 to the site management unit 312. Here, if necessary, individual data are transmitted between the communication control unit and each server station 2, and further this unit 311 transmits the same data to each server station 2 all at the same time.

The broadcast control unit 311 controls the digital broadcast carried out via the satellite BC, that is, the entire transmission operation in which the same data are transmitted all at the same time to each and every terminal device 1.

The site management unit 312, as required, stores and manages the identification data of each server station 2 to the site data storage unit D12, and further monitors or analyzes the load data sent from each server station 2 and stores the result data to the site use status storage unit D11 for each server to be managed. Usually, load data is notified from each server station 2; however it can be analyzed autonomously. The site management unit 312 manages a reference value determined for each site. When the load in a server station 2 is equal to or more than the reference value for the site, the management unit 312 judges that the server station 2 is in a congested state, and sends to the server station 2 an instruction to transmit necessary data in order for some other one in place of the server station 2 to provide the data to the respective terminal device 1.

The provided data management unit 313 sorts and integrates global data sent from each server station 2, and further prepares useful data to be provided for each user, to be transmitted to the broadcast control unit 311. The useful data are, for example, the load of each server station 2 and the load status of the network 4, and they are mapped with predetermined map data stored in the map data storage unit D13, before they are provided. The map data contains, for example, a congestion map, which visually expresses the degree of congestion, which constantly changes in real time, for each site (that is, Real Time Congestion Map). Further, this unit provides information as to which site is busy and which site is popular in a menu form.

These useful data are common data which are used to notify to each and every user, and they are formed on the basis of the data sent from each server station 2. In the case where useful data is provided in the form of a virtual reality space, background images and object images which can be formed from the parts data and material data and the like, stored in the parts storage unit D14, are used to form the virtual reality space.

<Terminal Device>

Figure 4:
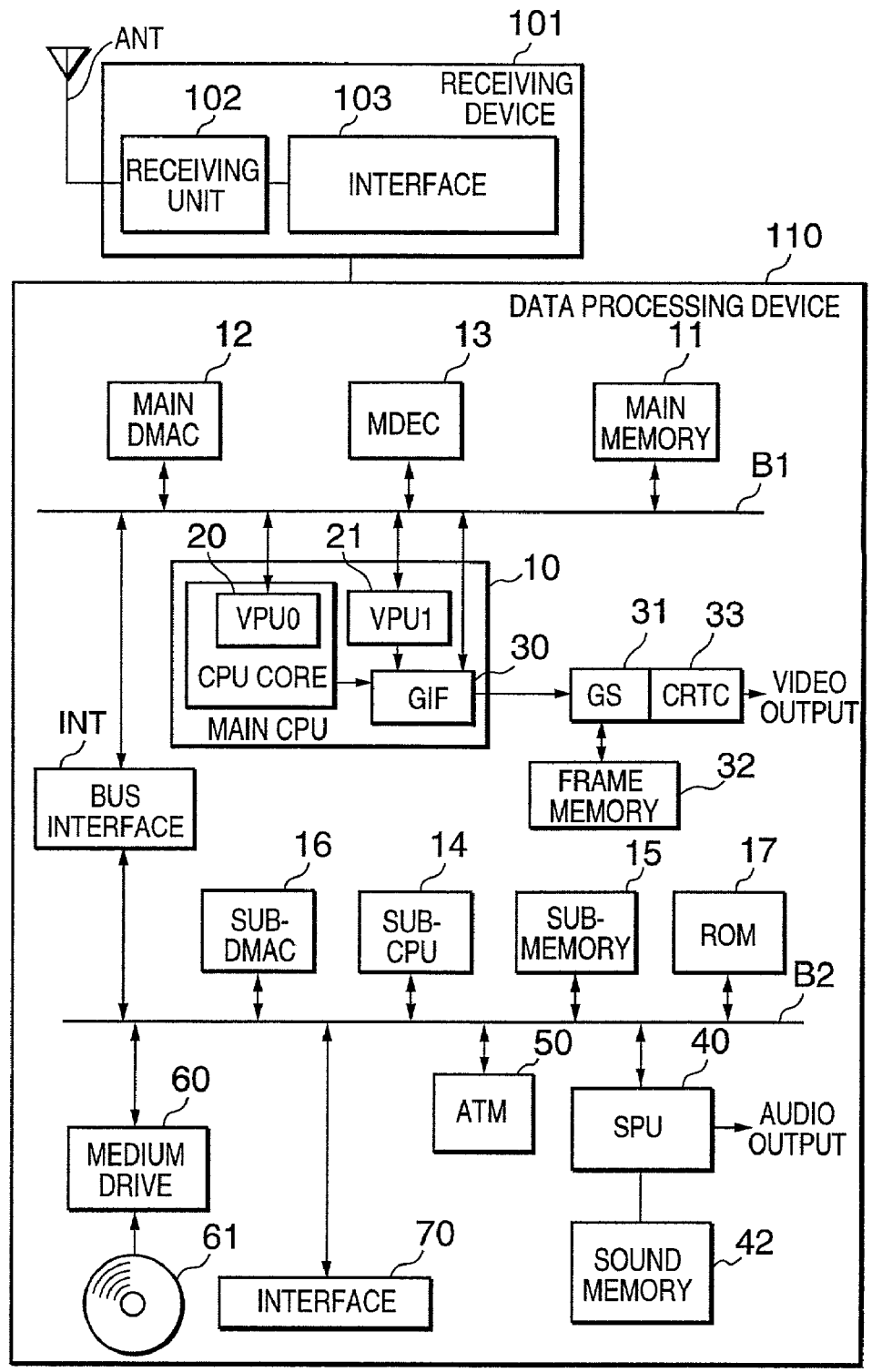
FIG. 4 is a structural diagram showing the hardware of the host station.

As shown in FIG. 4, a terminal device 1 mainly consists of a receiver device 101 for receiving a digital broadcast program distributed from the host station 3, and a data processing unit 110. The data processing unit 110 transmits and receives data individually between itself and the server station 2 via the network 4, and displays an image obtained from the data received by the receiver device 101 and the data received from the server station, on a display device. When it is of a type having a communication mechanism with the Internet and an interface with the receiver device 101, an entertainment device or domestic terminal can be used as the data processing device 110.

The receiver device 101 includes an antenna ANT, a receiver unit 102 equipped with a tuner for selecting a broadcast channel, and an interface unit 103 provided between the receiver unit 102 and the data processing device 110.

The receiver unit 102 receives data on the channel selected by the tuner by an external operation via the antenna ANT, and further decodes the received data to be sent to the interface unit 103. In this embodiment, transmission data distributed on the air are received with use of the antenna ANT; however in the case of a cable broadcasting such as CATV, data may be transmitted and received through an optical fiber or the like, instead of the antenna ANT.

The interface portion 103 has an interface used for sending data decoded by the receiver unit 102 to the data processing device 110. As the interface, a high-speed interface such as USB (universal serial bus) or IEEE 1394 is used. Such a high-speed interface is suitable for the transmission of large-size data such as image data.

The data processing device 110 has the following structure.

The data processing device 110 has a main bus B1 and sub-bus B2. These buses B1 and B2 are connected to each other via a bus interface INT in such a manner that they can be disconnected as needed. To the main bus B1, there are connected a main CPU 10 consisting of a first vector processing unit (VPU0 to be called the first VPU hereinafter) 20 tightly coupled with the CPU core, a second vector processing unit (VPU1 to be called the second VPU hereinafter) 21 which exists by itself, a graphical synthesizer interface (GIF) 30 serving as an arbiter for the first VPU 20 and the second VPU 21, and the like, a main memory 11 consisting of a RAM, a main DMAC (direct memory access controller) 12, and MPEG (moving picture experts group) decoder (MDEC) 13, as well as a graphic processing means (graphical synthesizer to be called "GS" hereinafter) 31 which is connected via the GIF 30. A CRTC (CRT controller) 33 for generating a video output signal connected to the GS 31.

When staring the data processing device 10, the main CPU 10 reads the starter program from the ROM 17 on the sub-bus B2 via the bus interface INT, and starts the operating system by executing the starter program. Further, the CPU controls a media drive 60 and read application programs and data from a medium 61 mounted in the media drive 60, which are then stored in the main memory 11. Further, the CPU carries out, in collaboration with the first VPU 20, a geometry processing on three-dimensional object data (coordinate values of apexes (representative points) of polygons) constituted by, for example, a plurality of basic figures (polygons).

The first VPU 20 has a plurality of calculation elements for calculating a real number of the floating point, and these elements carry out calculations of floating points in parallel. More specifically, the main CPU 10 and the first VPU 20 carry out arithmetic operations which require a fine operation in the unit of each polygon in the geometry processing. Further, the first VPU 20 generates a display list containing a series of apex coordinates obtained by the arithmetic operations and polygon definition data such as shading mode data.

As in the case of the first VPU 20, the second VPU 21 carries out calculations of floating points in parallel. Then, it generates a display list having contents of relatively simple two-dimensional polygon definition data. This data can be generated by operations for generating an image by the operation of an operating device and a matrix, such as transparent conversion for a matter of a simple shape such as a building or an automobile, parallel light source calculation and two-dimensional curvature generation.

The display lists generated by the first VPU 20 and the second VPU 21 are transferred to the GS 31 via the GIF 30.

The GIF 30 is designed to arbitrate the display lists generated by the first VPU 20 and the second VPU 21 so that they do not collide with each other while they are transferred to the GS 31. The GS 31 holds graphical contexts, and reads a respective graphical context based on the identification data of the image context contained in the display list informed from the GIF 30. With use of the read context, a rendering process is carried out and thus polygons are drawn in a frame memory 32. The frame memory 32 can be used as a texture memory as well, and therefore a pixel image on the frame memory can be pasted as a texture on a polygon drawn.

The main DMAC 12 carries out a DMA transfer control onto each circuit connected to the main bus B1, and also carries out a DMA transfer control onto each circuit connected to the sub-bus B2 in accordance with the status of the bus interface INT. The MDEC 13 operates in parallel with the main CPU 10, and expands the data compressed by the MPEG (moving picture experts group) mode or JPEG (joint photographic experts group) mode or the like.

To the sub-bus B2, there are connected a sub-memory 15 consisting of a sub-CPU 14 having a structure of a microprocessor or the like, and a RAM, a sub-DMAC 16, a ROM 17 which stores programs including the operating system, a sound processing unit (SPU) 40 for reading sound data stored in a sound memory 42 and outputting it as an audio output, a communication control unit (ATM) 50 for transmitting or receiving data between itself and the server station 2 via the network 4, a media drive 60 for setting media such as CD-ROM and DVD-ROM, and an input unit 70.

The input unit 70 is an interface having the same specification as that of the interface unit 103 of the receiver device 101. The data received by the receiver device 101 is input to this unit.

Next, examples of the operation using the data providing system of this embodiment will now be described.

FIRST EXAMPLE OF THE OPERATION

First, in the electronic commerce and contents distribution, a great number of terminal devices 1 access all at once to one server station 2, and therefore the congestion can easily occur in the server station 2 and the network 4. Here, an example of the operation for preventing such congestion will now be discussed.

Figure 5:
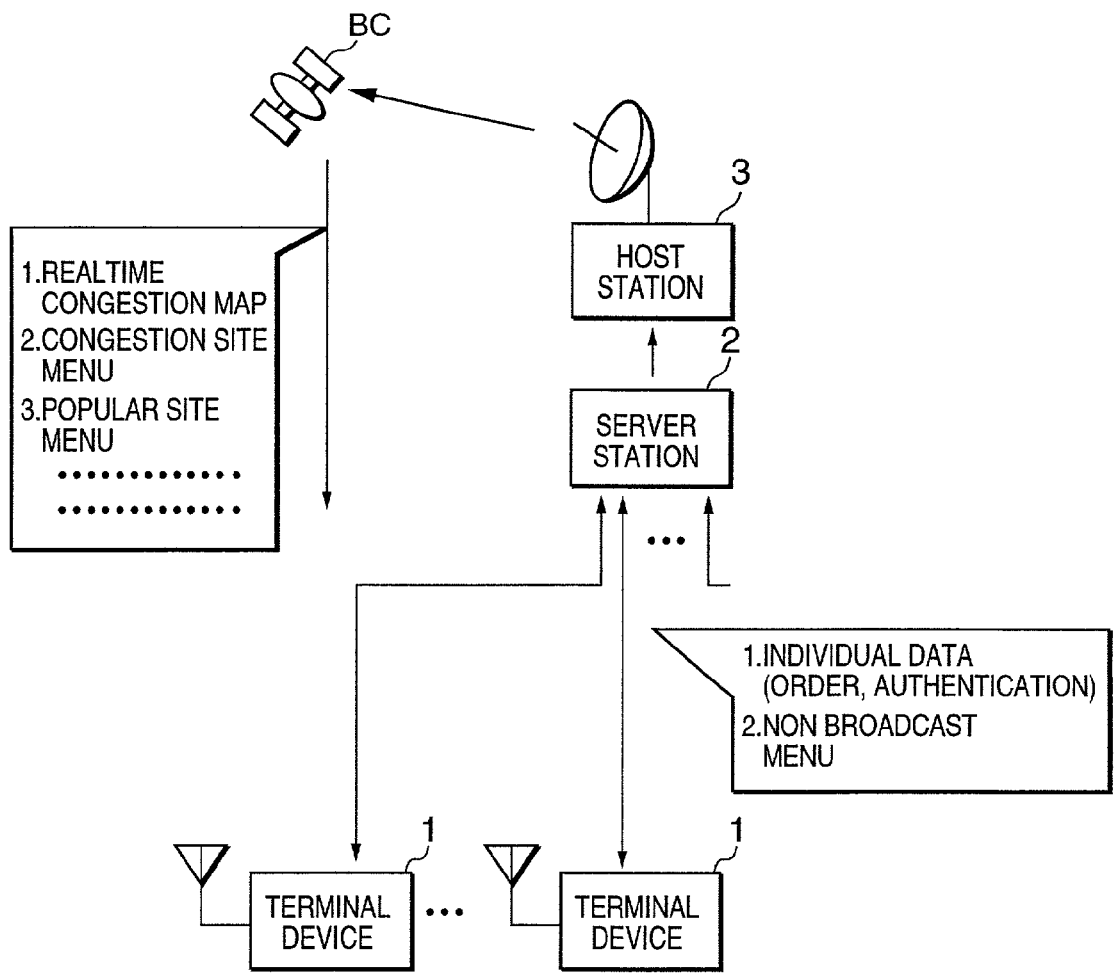
FIG. 5 is an explanatory diagram illustrating the technical concept of the first example of the operation of the system.

FIG. 5 briefly shows an example of such an operation. Here, individual data to be provided for a particular one of a plurality of terminal devices 1, which made a request of providing data, are divided to the particular terminal device 1 and the individually communicable server station 2. At the same time, common data indicating the load status of the server station 2 or the network 4 is supplied to the host station 3 as well. Thus, the transmission of the common data is done prior to the transmission of the individual data. This example presents a status of a case where the server station actually makes access to the terminal device 1 to be accessed.

Examples of the individual data are order data used in the electronic commerce, authentication data and menu data of the digital broadcasting. Examples of the load data are a real time congestion map, a congestion site menu and popular site menu. It is only natural that these data are just examples.

Figure 7:
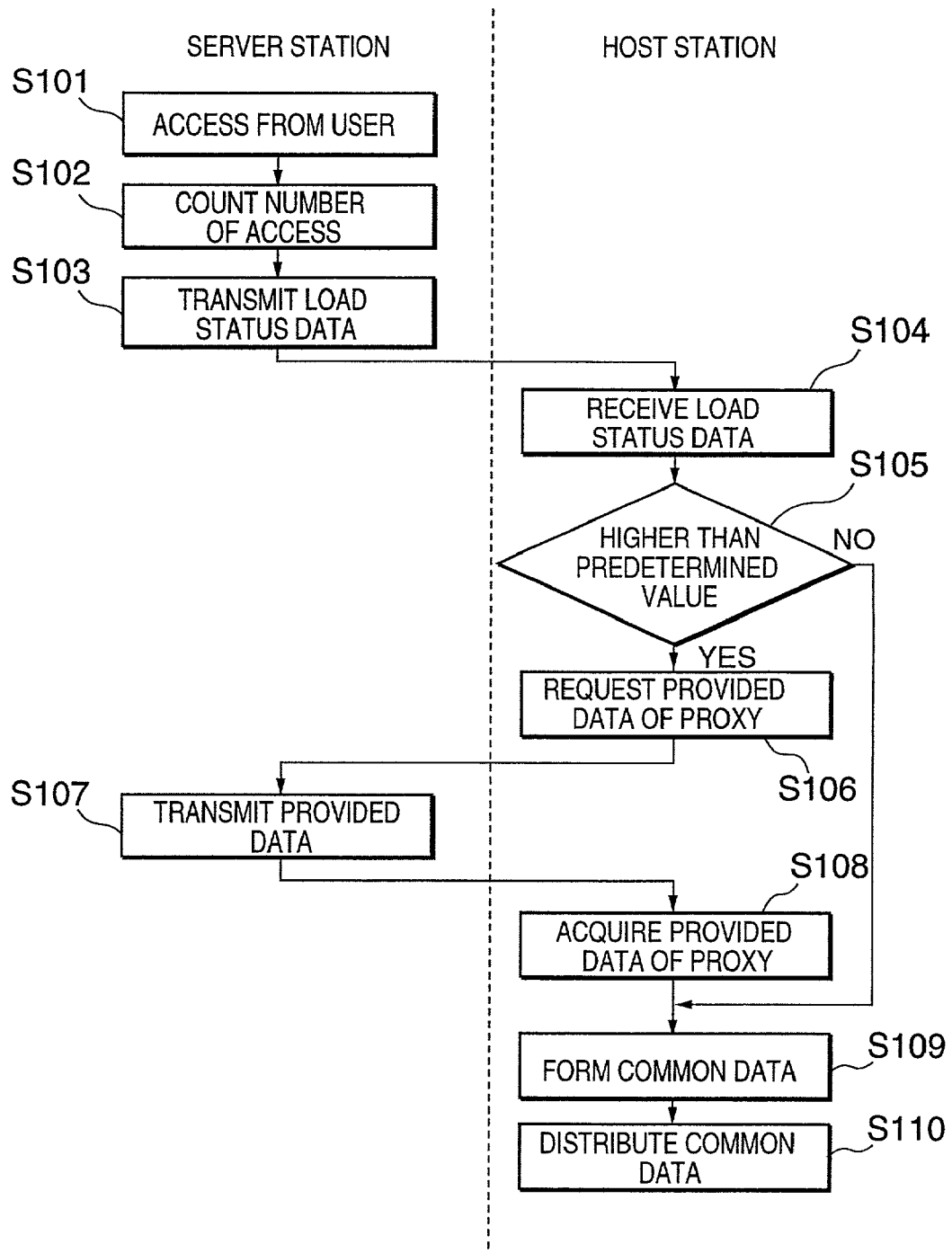
FIG. 7 is an explanatory diagram illustrating the procedure of the system in the first example of the operation.

FIG. 7 shows the operational procedure which involves the server station 2 and the host station 3 in the above-described situation.

The server station 2 counts the number of accesses each time a terminal device 1 makes access to it (steps S101 and S102). The counted number is handled as the load data indicating the load status of the server station 2. The load data is sent to the host station 3 via the transmission and reception unit 202 (step S103).

The host station 3 receives the load data sent from the server station 2 (step S104), and compares it with the reference value for the load status preset by the data analysis unit 311. When the access number indicated by the load data is larger than the reference value, it is judged that the server station 2 is in a congested state. On the other hand, when the load data indicated by the load data is smaller than the reference value, it is judged that the server station 2 is not in a congested state, and the operation proceeds on to the step 109 (step S105: No).

While in a congested state, the host station 3 requests the respective server station 2 to send necessary data to the host station 3 so as to be able to serve as a substitute which can provide data for the terminal device 1 in place of the server 2 (step S105: Yes, S106).

When there is a request from the host station 3 that it will provide data in place of the server station 2, the respective server station 2 transmits the requested data and the other necessary data to the host station 3 (step S107). An example of such data provided in a substituted manner is the top page of an Internet homepage.

The host station 3 forms common data to be broadcasted, from the obtained load data and data to be provided in the substituted manner, for each server station 2 (step S109). The thus formed common data are distributed to all of the terminal devices 1 all at once in real time (step S110). The user receives the common data broadcasted from the host station 3 with the terminal device 1, on which the data are displayed.

With the above-described example of the operation, it is possible to find out the congestion state of each server station 2 before trying to access to the server station 2. Therefore, it is possible to cancel accessing of a server station 2 in a congested state in advance. Since the data from that server station 2 are included in the common data distributed from the host station 3, it becomes possible for the user to obtain desired data without accessing the server station 2.

SECOND EXAMPLE OF THE OPERATION

As the second example, a case where data is provided to a user via a virtual reality space will now be described. Here, an Internet game is considered.

The data appearing in the virtual reality space include data for the position or the like of an object image, as well as behavior limitation data used to limit the movement of each individual object image.

The virtual reality space may be of one unity common to a plurality of terminal devices 1 and the server station 2;

however in this example, partial spaces are established and these partial spaces are associated together to become one entire virtual reality space. In the case where one virtual reality space is constituted as a whole, each individual virtual reality space is called "partial space". An example of the partial space is a game space consisting of a plurality of stages in which a player can keep on moving forward to the next stage each time the present stage is cleared. In this case, one stage is formed in each and every partial space, and one gate space is established by associating all the stages together.

In this example, in order to reduce the load on the processing and the size of data flowing through the network; the terminal devices 1 and each server station 2 share the basic parts data, the material data and the like, which constitute its partial space, and they carry out calculations for the virtual reality space at the same time in parallel. The parts data and material data of the terminal device 1 are recorded on a media such as a CD-ROM or DVD-ROM as they are received individually from the server station or distributed by the broadcasting from the host station 3, and then these media are distributed. The parts data, the material data and the like are preserved in the host station 3 as well.

Figure 6:
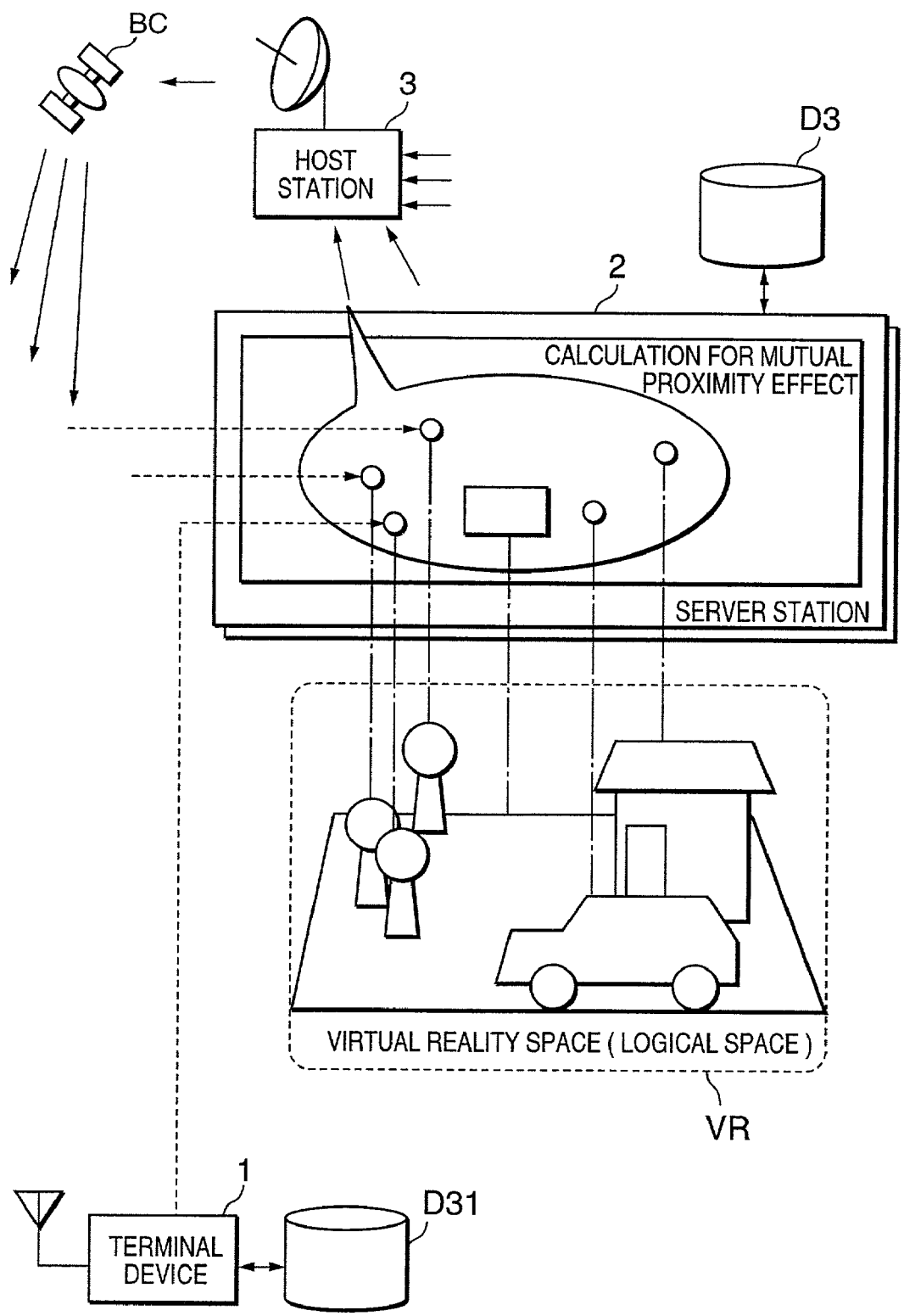
FIG. 6 is an explanatory diagram illustrating the technical concept of the second example of the operation of the system.

FIG. 6 is an explanatory diagram illustrating the technical concept of the processing in the operation of this example.

The server station 2 performs calculations for the mutual proximity effect between the partial spaces of the users accessing via the terminal devices 1 (excluding the users who are only standing by to watch) to the partial space managed by the station 2 itself, on the basis of the respective data such as the parts data and material data sent from the host station 3. The results of the calculations are sent back to the user as a response. At the same time, the space state data, which is the results of the calculations, are transferred by uplink to the host station 3. The "calculation of the mutual proximity effect" can be defined as the calculation of the change in the positional relationship between the object images of the user and others, and the change in the status when an object image is moved.

The host station 3 integrates uplinks of the partial spaces from the server stations 2, and then broadcasts it as the data indicating the common virtual reality space.

The terminal device 1 calculates the virtual reality space on the basis of the response from the server station 2 and the status data broadcasted, using the parts data and material data as in the case of the server station 2. In the case of the mutual proximity effect of a low latency, the reaction is calculated on the basis of the response from the server 2, and the result is sent back to the server station 2 as a response. The movement limitation between partial spaces is calculated on the basis of the data broadcasted from the host station 3 as a remote operation. Thus, a user can stand by and watch the virtual reality space only by the broadcasted data without actually accessing to the server station 2. Further, the transfer of an object between partial spaces can be smoothly limited on the basis of the calculation of the status of the server station (partial space) to which an object is transferred, and the calculation of the remote operation, from the broadcasted data. In this manner, congestion resulting from needless concentration of accessing can be avoided.

The number of users who actually perform the mutual proximity effect must be limited in the partial space. The limitation of entering of many users at once from a remote space is more difficult than the calculation of the mutual proximity effect; however with use of the broadcasted data described above, such a limitation can be easily performed.

Figure 8:
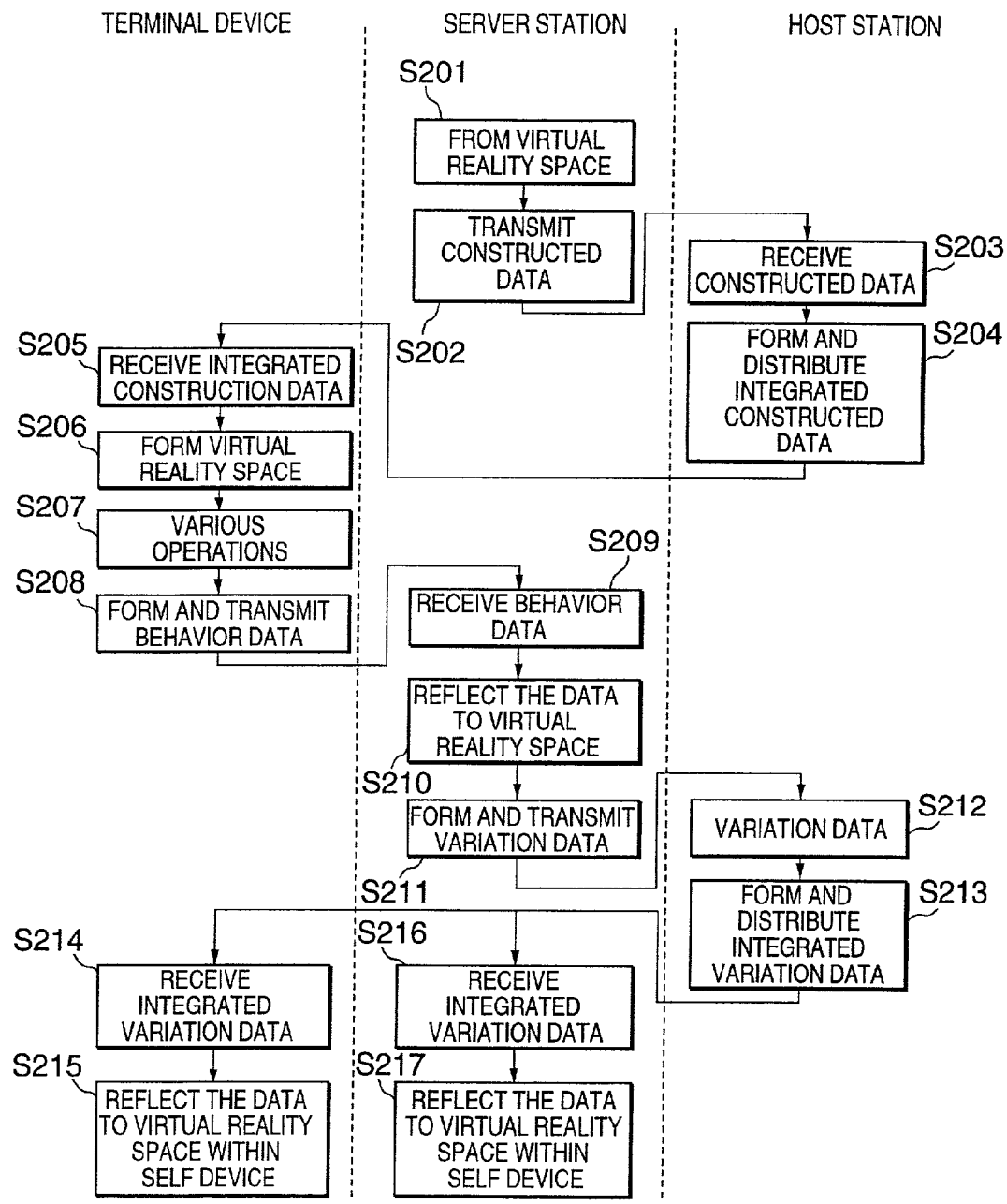
FIG. 8 is an explanatory diagram illustrating the procedure of the system in the second example of the operation.

FIG. 8 is an explanatory diagram illustrating the procedure using the terminal device 1, the server station 2 and the host station 3 in this example of the operation.

First, a partial space is constructed (formed) for each of a plurality of server stations 2, and the structure data for each partial space and the data indicating the status are transmitted to the host station 3 (steps S201 and S202). The host station 3 integrates structure data received from all of the server stations 2 to generate integrated structure data, and distributes the integrated structure data all at once to all of the terminal devices 1 (steps S203 and S204).

A terminal device 1 extracts the data of a server station 2 to which the terminal device 1 is accessing, out of the received integrated structure data. Then, this device constructs (forms) a virtual reality space within the device itself (steps S205 and S206). The virtual reality space has the same structure as the partial space within the server station 2 to be accessed.

The user carries out the operation of an object image to appear, move, disappear and the like, in the virtual reality space inside the self device, within a range limited on the basis of the behavior limitation data determined in advance (step S207). The processing corresponding to this operation is executed within the terminal device 1. The change of the status of the virtual reality space formed in the terminal device 1 by the user's operation is sent out to the server station 2 as the behavior data in real time (step S208).

The server station 2 analyzes the behavior data sent from each terminal device 1, and the result of the analysis is reflected on the contents of the virtual reality space. The change of the virtual reality space generated within each terminal device 1 follows the behavior limitation data, and therefore the changes of the device will not contradict with each other even if the change is reflected on the virtual reality space within the server station 2.

Further, it is allowed to operate on the virtual reality space in the server station 2 directly by the terminal device 1, and by this operation, the status of the virtual reality space in the server station 2 can be changed (steps S209 and S210). Thus, the change of the status of the virtual reality space in the server station 2, which occurs on the basis of the behavior data or by the direct operation, is handled as the variation data indicating the status of the virtual reality space after the variation, and then transmitted to the host station 3 in real time (step S211).

When it receives the variation data from each server station 2, the host station 3 integrates the received data so as to form integrated variation data. The integrated variation data is distributed to all of the terminal devices 1 in real time. The integrated data is supplied to each server station 2 as well (step S212 and S213). The integrated variation data includes the variation data of the virtual reality space within each server station 2, the behavior limitation data which changes along with the variation of the virtual reality space, the data of the load status of each server station 2, and the like. In the case where one virtual reality space is formed by a plurality of server stations 2, the integrate data sometimes includes the data of the global variation status generated by the variation status of each partial virtual reality space.

The terminal device 1 receives the integrated variation data and reflects it to the contents of the virtual reality space within the device itself (steps S214 and S215). The server station 2 receives the integrated variation data and reflects it to the contents of the virtual reality space within the device itself (steps S216 and S217).

As described above, each terminal device 1 forms the same virtual reality space as that of the accessed server 2 within the terminal device itself, and carries out various operations on the terminal device side. Therefore, the load due to the processing which is originally executed on the server station side as operated by the terminal device side, can be reduced.

The load on the network 4 at the time of access can be reduced.

Further, from the integrated variation data from the host station 3, the status of the virtual reality space within some other server station 2 can be known, and therefore when the terminal device 1 accesses another virtual reality space, the space of the same status as that of that virtual reality space can be constructed immediately. Furthermore, even a terminal device 1 which is not accessing any server station 2 can create and enjoy the status of the virtual reality space of a respective server station 2, within the terminal device itself by receiving the integrated structure data and integrated variation data.

It should be noted that the above-described examples presents cases where a server station 2 provides individual data to a terminal device 1, and data common to a plurality of terminal devices 1 is broadcasted via a host station 3; however the present invention can be applied generally to all the cases where part of data to be provided is transmitted to all of the terminal devices 1 which are in a communicable state, from one of a server station 2 and the host station 3, and the rest of the data to be provided is transmitted to them from the other of the server station 2 and the host station 3, and thus the data to be provided is reproduced in each of the terminal devices 1 in real time.

As is clear from the above descriptions, according to the present invention, the resource of the broadcasting and network can be efficiently utilized, and therefore it becomes possible for the user to obtain desired data more efficiently than the conventional technique.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A data providing system, comprising:
a plurality of first devices for communicating individually with a plurality of terminal devices each connected to a network; and
a second device for broadcasting data to all of the terminal devices which are in a communicable state with the first devices,
wherein each of the plurality of first devices transmits individual data prepared in accordance with a request from one of the terminal devices to the one of the terminal devices via the network, and
the second device broadcasts data indicating an operation state of the network, which changes occasionally in accordance with a load on a respective one of the first devices, to all of the terminal devices in real time, and transmits as a proxy for the one first device data to be sent by the one first device when some or all of the plurality of first devices have a load which exceeds a predetermined value.

2. A data providing system according to claim 1, wherein at least one of the first devices further comprises: a first data generator for generating load data indicating a load status of the at least one first device which changes occasionally in accordance with an access status sent from the plurality of terminal devices; and a unit for transmitting the generated load data to the second device in real time; and
the second device includes a second data generator for generating the operation state data on the basis of the load data received from the at least one of the first devices.

3. A data providing system, comprising:
a first device for communicating individually with a plurality of terminal devices each connected to a network; and
a second device for broadcasting data to all of the terminal devices which are in a communicable state with the first device,
wherein the plurality of terminal devices and the first device are of types which enable a common logical space to be formed,
the first device detects a request to revise the logical space from at least one of the terminal devices, and revises the logical space on the basis of a detected status, and
the second device broadcasts the status of the logical space after the revision in the first device to the plurality of terminal devices.

4. A data providing system, comprising:
a plurality of first devices for communicating individually with a plurality of terminal devices each connected to a network; and
a second device for broadcasting data of the same contents to the plurality of terminal devices,
wherein each of the plurality of first devices has a logical space formed therein to be accessible by the plurality of terminal devices, the logical spaces being formed associated with each other, and
the second device, when the status of the logical space changes in one of the first devices, varies the status of the logical space of other first devices on the basis of the changed status in the one of the first devices, and provides the statuses of all the logical spaces after the variation to the plurality of terminal devices in real time.

5. A data providing system according to claim 4, wherein at least one of the plurality of terminal devices further comprises:
a status changer for forming a logical space within the at least one terminal device and for changing the status of the formed logical space, the logical space formed within the at least one terminal device having the same structure as the logical space formed in the first device to be accessed by the at least one terminal device, and
a data transmitter for transmitting in real time, when the status of the logical space within the at least one terminal device has changed, data indicating the changed status to the first device to be accessed by the at least one terminal device.

6. A data providing apparatus, comprising:
a first communication unit for transmitting part of reproducible data to be provided to a first device capable of communicating individually with a plurality of terminal devices connected to a network, so as to cause the first device to transmit the data to each of the plurality of terminal devices;
a load detector for detecting a load on the first device when individually transmitting the data to be provided to one of the plurality of terminal devices via the network;

a generator for generating operation state data indicating an operation state of the network, which changes occasionally in accordance with the detected load of the first device; and a second communication unit for broadcasting the generated operation state data to all of the terminal devices which are in a communicable state with the first device, wherein all of the terminal devices in the communicable state are caused to construct an environment in which the terminal devices in the communicable state can reproduce the data to be provided in real time in cooperation with the first device.

7. A data providing apparatus according to claim 6, further comprising a proxy transmission unit for transmitting, as a proxy, individual data to be transmitted by the first device when the load detected by the load detector exceeds a predetermined value.

8. A data providing apparatus, comprising:

a first communication unit for communicating with a first device capable of communicating individually with a plurality of terminal devices connected to a network; and a second communication unit for broadcasting data to all of the terminal devices which are in a communicable state with the first device, wherein a common logical space can be created in the plurality of terminal devices and the first device, the first device detects a request to revise the logical space from at least one of the terminal devices, and revises the logical space on the basis of the detected request, and the second communication unit handles the status of the logical space after the revision in the first device, acquired through the first communication unit, as the data to be broadcasted.

9. A data providing apparatus, comprising:

a first communication unit for communicating with a plurality of first devices capable of communicating individually with a plurality of terminal devices connected to a network; and a second communication unit for broadcasting data to all of the terminal devices which are in a communicable state with the plurality of first devices, wherein each of the plurality of first devices forms a logical space accessible by the plurality of terminal devices, the logical spaces being formed in association with each other, and the second communication unit acquires a changed status via the first communication unit when the status of the logical space has changed in one of the plurality of first devices, and handles the status of the logical spaces in other of the plurality of first devices which have changed in accordance with the changed status in the one first device, as the data to be broadcasted.

10. A recording medium recorded with a computer program for causing a computer to function as a data providing device, said device comprising:

a first communication unit for transmitting part of reproducible data to be provided to a first device capable of communicating individually with a plurality of terminal devices connected to a network, so as to cause the first device to transmit the data to each of the plurality of terminal devices;

a load detection unit for detecting a load on the first device when individually transmitting the data to be provided to one of the plurality of terminal devices via the network;

a generator for generating operation state data indicating an operation state of the network, which changes occasionally in accordance with the detected load of the first device; and a second communication unit for broadcasting the generated operation state data, to all of the terminal devices which are in a communicable state with the first device, wherein the data providing device causes each of the plurality of terminal devices in the communicable state to construct an environment in which the plurality of terminal devices in the communicable state can reproduce the data to be provided in real time in cooperation with the first device.

11. A recording medium recorded with a computer program for causing a computer to function as a data providing device, said device comprising:

a first communication unit for communicating with a first device capable of communicating individually with a plurality of terminal devices connected to a network; and a second communication unit for broadcasting data to all of the terminal devices which are in a communicable state with the first device, wherein a common logical space can be created in the plurality of terminal devices and the first device, the first device detects a request to revise the logical space from at least one of the terminal devices, and revises the logical space on the basis of the detected request, and the second communication unit handles the status of the logical space after the revision in the first device, acquired through the first communication unit, as the data to be broadcasted.

12. A recording medium recorded with a computer program for causing a computer to function as a data providing device, said device comprising:

a first communication unit for communicating with a plurality of first devices capable of communicating individually with a plurality of terminal devices connected to a network; and a second communication unit for broadcasting data to all of the terminal devices which are in a communicable state with the plurality of first devices, wherein each of the plurality of first devices forms a logical space accessible by the plurality of terminal devices, the logical spaces being formed in association with each other, and the second communication unit acquires a changed status via the first communication unit when the status of the logical space has changed in one of the plurality of first devices, and handles the status of the logical spaces in other of the plurality of first devices which have changed in accordance with the changed status in the one first device, as the data to be broadcasted.

* * * * *